UNITED STATES PATENT OFFICE.

EDWARD J. WALL, OF SYRACUSE, NEW YORK, ASSIGNOR TO KALMUS, COMSTOCK & WESCOTT, INCORPORATED, OF BOSTON, MASSACHUSETTS, A CORPORATION OF MASSACHUSETTS.

RECOVERY OF DYE FROM SOLUTION.

1,297,046.  Specification of Letters Patent.  Patented Mar. 11, 1919.

No Drawing.  Application filed May 18, 1917.  Serial No. 169,465.

*To all whom it may concern:*

Be it known that I, EDWARD J. WALL, subject of the King of Great Britain, and resident of Syracuse, in the county of Onondaga and State of New York, have invented new and useful Improvements in Recovery of Dye from Solution, of which the following is a specification.

This invention relates to the recovery of dye from dye solutions and more particularly to the recovery of dye from dye solutions used for color-sensitizing collodion or gelatin emulsions or other light responsive substances.

There have been two methods in common practice for sensitizing collodion and gelatin emulsions, viz., one in which the dye is added to the emulsion just before coating the same on the film or other support, and one in which the finished dry plate or film is bathed in an aqueous solution of the dye. The first method has been generally adopted in the commercial manufacture of color-sensitive plates and films, not on the basis of efficiency and effectiveness but because of its convenience. The second method affords results which are far superior with respect to color rendering, but it has not been extensively adopted commercially chiefly for the reason that it has been extremely wasteful and therefore costly.

Heretofore, in employing the second or bathing method it has been possible to use the dye solution for only a comparatively short time. As described in the application of Daniel F. Comstock and Edward J. Wall, Ser. No. 179,050, filed July 6, 1917, the dye solutions, which are of colloidal character, begin to precipitate the dye after a brief association with the photographic emulsions, and their sensitizing power rapidly diminishes. Moreover, even in the absence of precipitation the sensitizing power of the solutions gradually decreases owing to absorption of the dye by the emulsions. The addition of fresh dye to strengthen a dissipated solution is not feasible for the reason that the strength of the solution can not be kept sufficiently constant in this way, especially when the dye is composed of a plurality of components which are absorbed by the silver grain and gelatin in varying proportions. In order successfully to prolong the useful life of a dye solution by adding fresh dye, it is necessary continually to test the solutions spectrographically; and this is impractical. Consequently it has been the practice heretofore wholly to discard the solutions after a short period of use.

In the case of the triphenylmethane, phthalein or similar dyes, the rejection of used and partially exhausted baths is of no serious moment as these dyes are comparatively cheap. However, since the introduction of the isocyanin and similar dyes, which have proved to be vastly superior, this wastage of dye has rendered the bathing method practically prohibitive. And irrespective of the cost of the dye the bathing method has been exceedingly uneconomical inasmuch as only a relatively small portion of the dye content of the bathing solution has been used. The above mentioned prior application discloses a way in which the useful life of a dye solution can be greatly prolonged but in any event the solution becomes useless before the dye content is completely exhausted.

The objects of the present invention are to recover the dye from partially spent solutions so that it may be employed in the preparation of other dye solutions and to recover the dye in substantially its original form so that it may be employed in the same way as fresh dye.

The dye solutions to which this invention is particularly applicable usually comprise a solution in which the dype is suspended in a colloidal state. The present invention consists in mixing with a partially spent dye solution of this character, a dye solvent which will dissolve the colloidal dye, then separating from the solution the dye solvent with the dissolved dye and, if desired, subsequently evaporating or otherwise separating the solvent from the dye. The dye solvent may be separated from the solution in any suitable manner, as for example by means of a centrifuge, but in the preferred method of applying the invention a dye solvent is employed which is immiscible with the solution, so that after agitating the solvent with the solution to dissolve out the dye the mixture will separate into layers upon allowing it to stand quietly for a time, one layer comprising the dye solvent and dissolved dye and the other layer comprising the original dye solution minus its dye content. Suitable dye solvents for the purpose include benzol, chloroform, ether, carbon, tetrachlorid and other volatile hydrocarbons.

The isocyanin and similar dyes are usually applied to films and plates in the form of aqueous baths, that is, baths in which the dyes are contained in water, the dyes being suspended in colloidal state throughout the water. The particular dye solvents above mentioned are immiscible in water and may therefore be separated from the solution in the preferred manner, that is, by permitting the mixture to separate after the agitation into separate layers consisting, in this particular example, of water and hydrocarbon respectively. One of the layers may then be drawn off and the hydrocarbon containing the dye may be evaporated off leaving the dye in a solid state.

I claim:

1. The method of recovering the dye from an aqueous dye solution comprising mixing with the solution a dye solvent which is immiscible with water so that the dye is at least in part dissolved by the solvent, and separating the dye solvent and dissolved dye from the water of the aqueous dye solution.

2. The method of recovering the dye from an aqueous dye solution comprising mixing with the solution a hydrocarbon which is immiscible with water and which is a solvent of the dye in the solution, thereby to dissolve out the dye at least in part, and separating the hydrocarbon and dissolved dye from the water of the aqueous solution.

3. The method of recovering the dye from an aqueous dye solution comprising agitating a volatile hydrocarbon in the dye solution, thereby dissolving out the dye at least in part, separating the hydrocarbon and dissolved dye from the solution, and evaporating the volatile hydrocarbon from the dye.

4. The method of recovering the dye from a colloidal dye solution comprising mixing a dye solvent with the solution so as to dissolve out the colloidal dye, and separating the dye solvent with the dissolved dye from the solution.

Signed by me at Boston, Massachusetts, this fifteenth day of May, 1917.

EDWARD J. WALL.